US010124723B2

(12) United States Patent
Letoumelin

(10) Patent No.: US 10,124,723 B2
(45) Date of Patent: Nov. 13, 2018

(54) VEHICLE INTERIOR LIGHTING DEVICE WITH LENS AS SWITCH OPERATING PORTION

(71) Applicant: Valeo Vision, Bobigny (FR)

(72) Inventor: Remi Letoumelin, Chessy (FR)

(73) Assignee: Valeo Vision, Bobigny (FR)

( * ) Notice: Subject to any disclaimer, the term of this patent is extended or adjusted under 35 U.S.C. 154(b) by 210 days.

(21) Appl. No.: 14/870,370

(22) Filed: Sep. 30, 2015

(65) Prior Publication Data

US 2016/0096470 A1    Apr. 7, 2016

(30) Foreign Application Priority Data

Oct. 2, 2014   (FR) ..................... 14 59447

(51) Int. Cl.
*B60Q 3/51*  (2017.01)
*B60Q 3/82*  (2017.01)
*B60Q 3/64*  (2017.01)

(52) U.S. Cl.
CPC ............. *B60Q 3/64* (2017.02); *B60Q 3/82* (2017.02)

(58) Field of Classification Search
CPC ... B60Q 3/00; B60Q 3/20; B60Q 3/51; B60Q 3/54; B60Q 3/82
See application file for complete search history.

(56) References Cited

U.S. PATENT DOCUMENTS

| | | | | |
|---|---|---|---|---|
| 6,092,917 A | * | 7/2000 | Litke | F21V 3/00 362/488 |
| 6,273,593 B1 | * | 8/2001 | Yabata | B60Q 3/80 362/487 |
| 6,616,311 B2 | * | 9/2003 | Soga | F21V 23/04 362/487 |
| 6,799,875 B2 | * | 10/2004 | Flokstra | B60Q 3/82 362/394 |
| 7,287,886 B2 | * | 10/2007 | Iwai | B60Q 1/26 362/488 |
| 7,521,739 B2 | | 4/2009 | Takahashi et al. | |
| 7,677,773 B2 | * | 3/2010 | Nagai | F21V 23/04 362/295 |
| 8,330,385 B2 | | 12/2012 | Salter et al. | |
| 2004/0057246 A1 | | 3/2004 | Flokstra et al. | |
| 2006/0097291 A1 | | 5/2006 | Takahashi et al. | |
| 2007/0211483 A1 | | 9/2007 | Ando et al. | |
| 2011/0198995 A1 | | 8/2011 | Salter et al. | |

FOREIGN PATENT DOCUMENTS

JP       2005231518 A     9/2005

* cited by examiner

*Primary Examiner* — Ismael Negron
(74) *Attorney, Agent, or Firm* — Oblon, McClelland, Maier & Neustadt, L.L.P.

(57) ABSTRACT

A lighting device including a plurality of light sources for illuminating an interior of a motor vehicle, a switch operating portion, switching means for detecting a contact switch operating portion and generating a signal characteristic of this contact, and a mounting support for the switch operating portion. At least one of the plurality of light sources being activated in response to the signal, and the switch operating portion being mounted on the mounting support by the switching means.

19 Claims, 3 Drawing Sheets

VEHICLE INTERIOR LIGHTING DEVICE WITH LENS AS SWITCH OPERATING PORTION

CROSS-REFERENCE TO RELATED APPLICATIONS

This application claims priority to the French application 1459447 filed on Oct. 2, 2014, which application is incorporated herein by reference and made a part hereof.

BACKGROUND OF THE INVENTION

1. Field of the Invention

The invention relates to the devices designed to light the interior of a motor vehicle.

2. Description of the Related Art

As is known, motor vehicle interior lighting devices comprise a light source and a control interface for the light source. It has also recently become known practice to use a touch control interface produced in the form of a plate provided with sensors such that a contact on this plate controls the switching of the light source on or off.

Now, in such devices, the plate is mounted via mounting means on a mounting support, which is itself mounted in the interior. Consequently, the known devices require means for mounting the plate on its mounting support, which results in a loss of compactness of the device and an additional manufacturing cost.

Moreover, the plate is subject to the inherent stresses of the motor vehicle such as vibrations, bumps or even changes of trim. It has been found that these stresses compromise the accuracy of the detection of the contacts by the sensors of the plate, and in particular when the plate has a curved profile.

There is therefore a need for a lighting device for a vehicle interior with touch control which can offer optimal performance levels in the face of the inherent stresses of the vehicle, while being compact and easy to produce.

SUMMARY OF THE INVENTION

Such is the context of the present invention and its object is to propose a lighting device for a motor vehicle interior, comprising at least:

one or more light sources suitable for emitting light rays for the lighting of said interior, a touch interface and sensor means for detecting a contact on the touch interface and generating a signal characteristic of this contact according to which the light source or sources is/are controlled, and a mounting support for the touch interface in the vehicle.

The device according to the invention is noteworthy in that the touch interface is mounted on the mounting support via the sensor means.

On the one hand, by virtue of the invention, the sensor means form means for mounting the touch interface on the mounting support. It is thus possible to dispense with mounting means, which makes it possible to improve the compactness of the device while reducing its manufacturing cost.

On the other hand, the sensor means are subject to the same stresses as the touch interface, which makes it possible to take into account these stresses and therefore improve the accuracy of the detection of the contacts on the plate.

The sensor means can for example be sensors arranged to detect a deformation of the touch interface and generate data relating to the presence of this deformation and possibly relating to characteristics associated with this deformation, such as, for example, its intensity or its recurrence. For example, the sensor means can be of capacitive type or, as a variant, of resistive type.

Advantageously, the device according to the invention comprises at least one controller suitable for receiving data generated by the sensor means, for compiling these data to determine the area of contact on the touch interface and for sending to the light source, as a function of the contact area, instructions to switch on and/or switch off and/or change intensity and/or color of this light source.

The computation method used by the controller can notably consist of a barycenter computation. For example, the controller can give each measurement performed by one of the sensor means a weighting corresponding to the value of deformation of the touch interface recorded by these sensors. Once this computation has been done and the position of the contact estimated, the controller is advantageously programmed to compare this position with the geometrical data of the touch interface stored in the controller memory. If the comparison leads the microprocessor to estimate that the contact has occurred in a predetermined area of the touch interface, the microprocessor generates an instruction to switch on the light source.

Advantageously, the device comprises at least three sensor means suitable for blocking movements of the touch interface on its mounting support in a first direction. This first direction is preferably the main direction in which the touch interface is deformed upon a contact. For example, the first direction is orthogonal to the touch interface. With the touch interface being blocked in the main direction of the deformations provoked by the contacts, there is thus an assurance that only a deformation linked to a contact will give rise to a detection of a contact by the controller and false detections that can be provoked by stresses inherent to the behavior of the vehicle are thus avoided. If so desired, the touch interface has four edges and the device comprises four sensor means, for example each arranged at an edge of the touch interface, or, as a variant, each arranged at a corner of the interface.

According to an embodiment of the invention, at least one of the sensor means is also suitable for blocking movements of the touch interface on its mounting support in second and third directions that are orthogonal to one another and to the first direction. The isostatism of the touch interface with respect to the mounting support is thus ensured by virtue of this sensor means, and it is then possible to dispense with any additional mounting means.

According to another embodiment of the invention, the device further comprises at least one means for blocking movements of the touch interface on its mounting support in second and third directions that are orthogonal to one another and to the first direction. Advantageously, the blocking means comprises at least one flexible blade fixed both to the touch interface and to the mounting support. For example, the flexible blade can be fixed to an edge of the touch interface via a central portion of the blade and to the mounting support via each of its ends.

Advantageously, at least one or each sensor means comprises a groove into which is inserted a peripheral portion of the touch interface. If so desired, the peripheral portion can be a corner of the touch interface. Also advantageously, the or each peripheral portion comprises a boss arranged to come into contact with and deform a wall of the groove into which it is inserted. As a variant, the or each peripheral portion can comprise a ridge. Preferably, the or each peripheral portion comprises a top boss arranged to come into contact with and deform a top wall of the groove and a bottom boss arranged to come into contact with and deform a bottom wall of the groove. By virtue of the boss, the blocking of the touch interface on its mounting support in the first direction is reliably guaranteed.

According to one feature of the invention, the or each sensor means comprises a housing in which is arranged its groove, this sensor means comprising a bottom sensor arranged between the groove and a bottom wall of the housing. Advantageously, the bottom sensor is arranged so as to come into contact with both the groove and the bottom wall. If so desired, the bottom sensor can comprise a flexible printed circuit comprising means for detecting a deformation on the touch interface. For example, the flexible printed circuit can comprise two electrodes and support a dielectric. If appropriate, the flexible printed circuit is folded on itself to form a stack of an electrode, a dielectric and another electrode so as to form a capacitive detection means.

If so desired, the or each sensor means can further comprise a tensioned flexible element, for example a spring, arranged between the groove and a top wall of the housing. This flexible element makes it possible to increase the reliability of the blocking of the touch interface on its mounting support in the first direction.

According to a variant, the or each sensor means can further comprise a top sensor arranged between the groove and a top wall of the housing. In addition to the increased reliability of the blocking of the touch interface on its support, this feature offers the advantage of adding a means for detecting a deformation on the touch interface and therefore of further improving the accuracy of the device.

If so desired, the touch interface can have a domed form, even a non-developable form, so as to delimit a cavity between the mounting support and the touch interface. This type of form makes it possible to increase the rigidity of the touch interface.

Advantageously, the touch interface can have rigidifying ridges. For example, the rigidifying ridges can be arranged in honeycomb form. Preferably, the rigidifying ridges can be arranged on a peripheral portion of the touch interface, even on two opposite peripheral portions.

According to a feature of the invention, at least one output portion of the touch interface is produced in a transparent or translucent material such that light rays emitted by the light source exit from the device via this output portion. According to this feature, the touch interface acts both as control means for the light source and as light output surface for this same light source. If appropriate, the device according to the invention can comprise a top mask surrounding the perimeter of the output portion. The top mask thus makes it possible to mask components, such as, for example, rigidifying ridges, of the device that might be detrimental to its esthetic appeal.

According to one embodiment of the invention, the light source is arranged between the mounting support and the touch interface at the level of the output portion. If so desired, the light source can be associated with an optical means arranged to deflect the light rays emitted by this light source towards a predetermined area of the interior. For example, the optical means can be a collimator or an optical guide arranged to deflect the light rays originating from the light source into a restricted area of the interior so as to produce a reader function.

If appropriate, the device can comprise a bottom mask arranged between the light source and the touch interface, in which the bottom mask comprises an orifice arranged facing the light source or the associated optical means. This latter feature makes it possible to mask components of the device, such as, for example, electrical connection cables of the light source. Advantageously, the bottom mask can extend over dimensions greater than or equal to those of the output portion.

Possibly, the bottom mask can comprise mounting means for the light source and/or for the associated optical means. For example, the light source and/or the associated optical means can be mounted on a substrate, for example a printed circuit, this substrate being screwed into the bottom mask.

Advantageously, the light source comprises a semiconductor chip, for example a light-emitting diode, emitting white light. If appropriate, the device can be arranged such that a contact on the touch interface at the level of the output portion triggers the emission of white light by the light source to produce a reader function.

As a variant, the light source can comprise a semiconductor chip, for example a light-emitting diode, emitting ultraviolet radiation and the output portion can comprise, at least at the level of the light source, photoluminescent patterns. These photoluminescent patterns are advantageously produced in a material, for example fluorescent or phosphorescent, suitable for emitting white light when it is subjected to ultraviolet radiation.

According to another non-exclusive embodiment of the invention, the light source is arranged at an end of the touch interface such that light rays emitted by the light source penetrate into the interface, the touch interface being arranged as a light guide to guide these light rays to the output portion. If appropriate, all of the touch interface can be produced in a transparent or translucent material.

Advantageously, the touch interface comprises decoupling means arranged at the level of the output portion and arranged such that light rays propagating in the touch interface and reaching these decoupling means exit from the touch interface through the output portion. These decoupling means can be produced in the form of diffusing prisms. Preferably, the decoupling means can be arranged in the form of one or more strips extending over the entire width of the touch interface. If appropriate, the device can be arranged such that a contact on the touch interface at the level of the output portion triggers the emission of light of a predetermined light power by the light source to produce a diffuse lighting of the interior, the light power being a function of the distance separating the point of contact from the light source.

If so desired, the light source can comprise a semiconductor chip, for example a light-emitting diode, emitting white light. As a variant, the light source can comprise a light-emitting diode of RGB (red-green-blue) type suitable for selectively and/or jointly emitting blue, red or green colored light.

Advantageously, the device can comprise first and second light sources suitable for emitting light rays for the lighting of the interior, each of the light sources being selectively controlled by the touch interface. If appropriate, the first and second sources can each be arranged at an opposite end of the touch interface, the touch interface being arranged as a light guide to guide the light rays emitted respectively by the first and second light sources respectively to first and second distinct output portions. In this case, the touch interface comprises first and second decoupling means arranged respectively at first and second output portions, the first and second decoupling means being exclusively associated with the first and second light sources. These first and second decoupling means can be for example be produced in the form of oriented prisms.

If so desired, the device can comprise first, second, third and fourth light sources suitable for emitting light rays for the lighting of the interior according to one or more of the embodiments described previously, each of the light sources being selectively controlled by the touch interface.

Another subject of the invention is a lighting device for a motor vehicle interior, comprising at least:

one or more light sources suitable for emitting light rays for the lighting of the interior, a touch interface and sensor means for detecting a contact on the touch interface and generating a signal characteristic of this contact according to which the light source or sources is/are controlled, wherein at least one output portion of the touch interface is produced in a transparent or translucent material such that light rays emitted by the light source exit from the device via this output portion, the touch interface being arranged as a light guide to guide these light rays to the output portion.

Another subject of the invention is a motor vehicle comprising a device for lighting the interior of the vehicle according to the invention.

Other features and advantages of the invention will become apparent on reading the following detailed description and for the understanding of which reference will be made to the attached drawings in which:

BRIEF DESCRIPTION OF THE ACCOMPANYING DRAWINGS

DETAILED DESCRIPTION OF THE PREFERRED EMBODIMENTS

Figure 1:
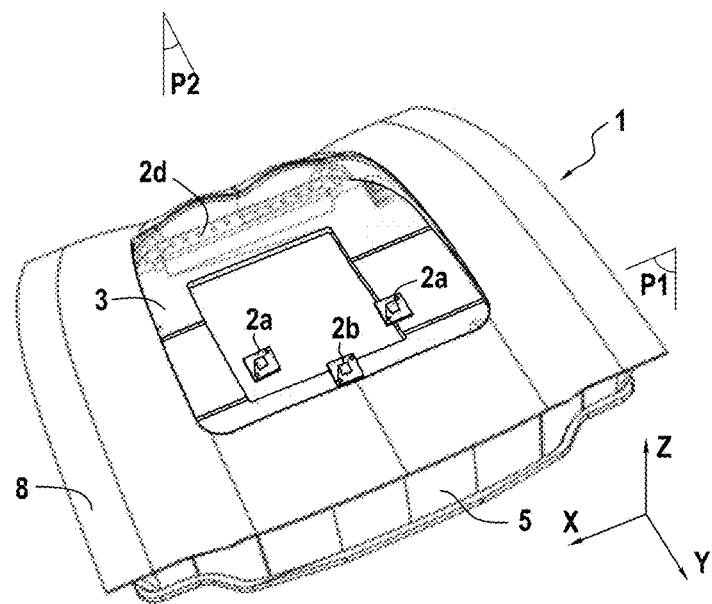
FIG. 1 is a perspective schematic representation of the device for lighting the interior according to a first embodiment of the invention.
Figure 2:
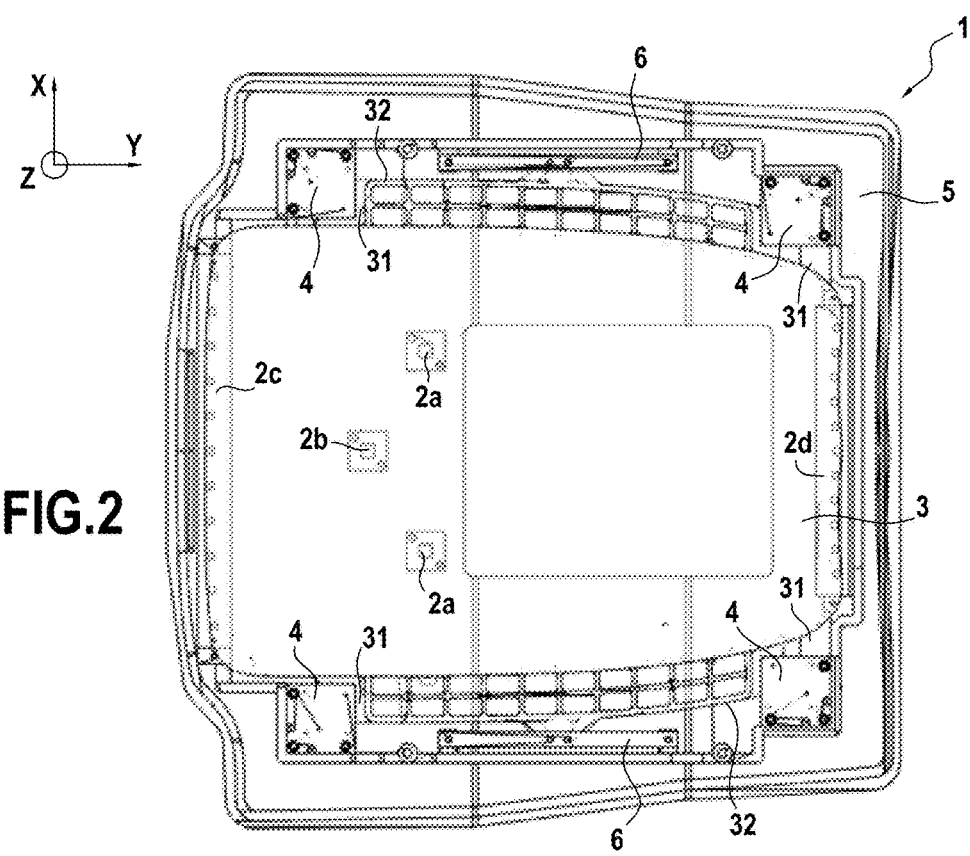
FIG. 2 is a schematic and partial plan view representation of the device of FIG. 1.

Reference is now made to FIGS. 1 and 2. FIG. 1 shows, from a perspective view, a device 1 for lighting a motor vehicle interior. FIG. 2 represents a part of this device 1 from a plan view.

The device 1 comprises first, second, third and fourth light sources 2a, 2b, 2c and 2d, each of these light sources 2a, 2b, 2c and 2d being suitable for emitting light rays for the lighting of the interior.

The device 1 also comprises a touch interface 3 and four sensor means 4 for detecting a contact on the touch interface 3 and generating a signal characteristic of this contact according to which one or more of these light sources 2a to 2d is/are controlled. The device 1 further comprises a top mask 8 arranged over the touch interface 3, represented only in FIG. 1.

The device 1 further comprises a controller, not represented, suitable for receiving data generated by the sensor means 4 so as to compile these data notably to determine the area of contact on the touch interface 3. The controller is moreover suitable for sending to the light sources 2a to 2d, as a function of the contact area, instructions to switch on, switch off, change intensity and/or change color of these light sources 2a to 2d. The computation method used by the controller consists, in the embodiment represented, in a barycenter computation. The sensor means 4 are arranged to detect a deformation of the touch interface 3 and generate data relating to the presence of this deformation and its intensity.

The controller gives each measurement performed by one of the sensor means 4 a weighting corresponding to the value of deformation of the touch interface 3 recorded by these sensors 4. Once this computation is completed and the position of the contact estimated, the controller is advantageously programmed to compare this position with the geometrical data of the touch interface 3 stored in the memory of the controller. If, from the comparison, the microprocessor estimates that the contact has occurred in a predetermined area associated with one of the light sources 2a to 2d of the touch interface 3, the microprocessor generates an instruction to switch on this associated light source 2a to 2d. The rest of the explanation of the embodiment of FIG. 1 will give examples of instructions to switch on the various light sources 2a to 2d.

The touch interface 3 has a domed form of non-developable profile and rigidifying ribs 32 arranged in honeycomb form and arranged on two opposite peripheral portions of the touch interface 3.

The device 1 comprises a mounting support 5 for the touch interface 3 in the vehicle. The touch interface 3 is mounted on the mounting support 5 via sensor means 4, each of the sensor means 4 being mounted on a peripheral portion 31 of the touch interface 3 extending from one of its edges.

The device 1 also comprises two flexible blades 6 forming means for blocking movements of the touch interface 3 on its mounting support 5 in two directions x and y orthogonal to one another and globally corresponding to the directions of extension of the mounting support 5. Each flexible blade 6 can be fixed to an edge of the touch interface 3 via a central portion of the flexible blade 6 and to the mounting support 5 via each of its ends.

The sensor means 4 are suitable for blocking movements of the touch interface 3 on its mounting support 5 in a direction z orthogonal to the directions x and y and in which the touch interface 3 is deformed upon a contact.

Figure 3:
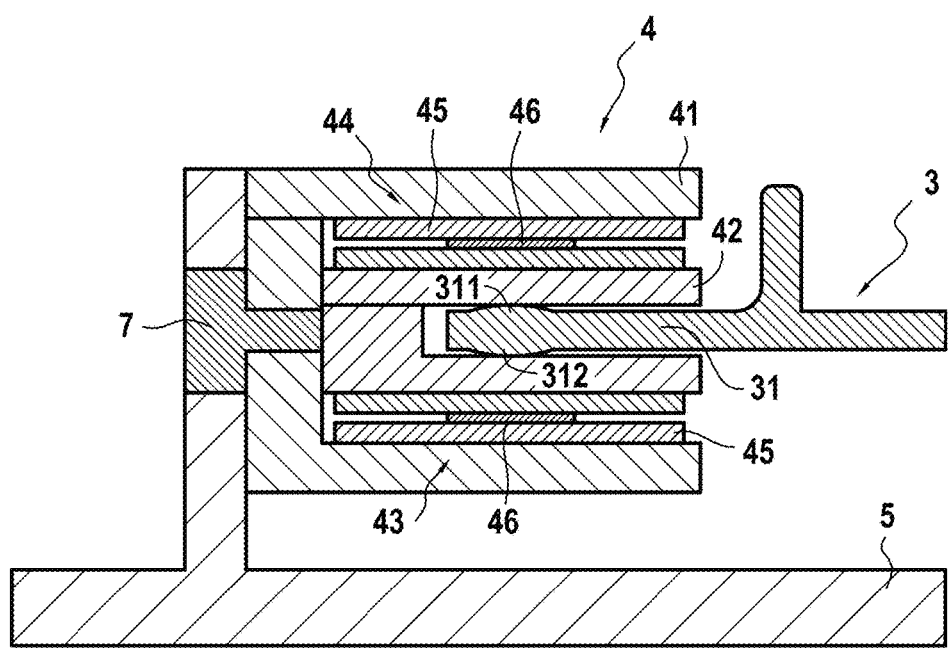
FIG. 3 is a schematic and partial cross-sectional representation of a sensor means of the device of FIG. 1.

In this regard, reference is made to FIG. 3 which represents, in cross section, one of these sensor means 4, the peripheral portion 31 of the touch interface 3 on which it is mounted and part of the mounting support 5 on which the sensor means 4 are mounted. Consequently, only one of these sensor means 4 will be described, it being understood that, in the embodiment illustrated by FIGS. 1 and 2, all the sensor means 4 are identical.

The sensor means 4 comprise a housing 41 comprising an orifice placed facing an orifice of a protuberance of the mounting support 5, a fixing means such as a screw 7 being inserted into these orifices to fix the housing 41 to the mounting support 5. A groove 42 is arranged in the housing 41. The peripheral portion 31 of the touch interface 3 is inserted into the groove 42. This peripheral portion 31 comprises a top boss 311 arranged to come into contact with and deform the top wall of the groove 42 and a bottom boss 312 arranged to come into contact with and deform the bottom wall of the groove 42.

The sensor means 4 comprises a bottom sensor 43 arranged between the groove 42 and the bottom wall of the housing 41 and a top sensor 44 arranged between the groove 42 and the top wall of the housing 41. Each of the bottom 43 and top 44 sensors comprises a flexible printed circuit 45 comprising means, for example of capacitive or resistive type, for detecting a deformation on the touch interface 3, the flexible printed circuit 45 being folded on itself and foam 46 being inserted in the space between the two parts of the printed circuit 45.

It will thus be understood that the structure of the sensor means 4, namely the deformable groove 42 and the foam 46 of the sensors 43 and 44, makes it possible to ensure that the sensors 43 and 44 are always in contact with the peripheral portion 31 and that movements of the touch interface 3 in the direction z with respect to the sensor means 4, and therefore to the mounting support 5, are prohibited by the sensor means 4. With the touch interface 3 therefore being blocked in the direction z, that is to say the main direction of the deformations provoked by the contacts, only a deformation linked to a contact can give rise to a detection of a contact.

Figure 4A:
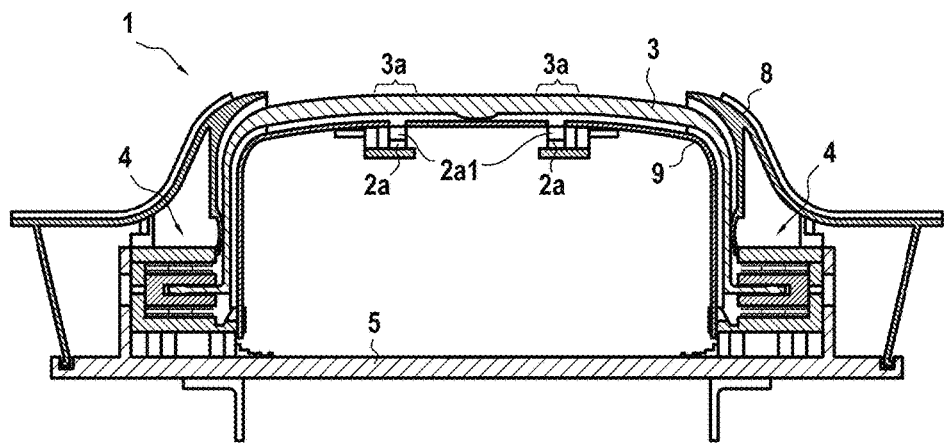
FIGS. 4A and 4B are schematic and partial cross-sectional representations of the device of FIG. 1.
Figure 4B:
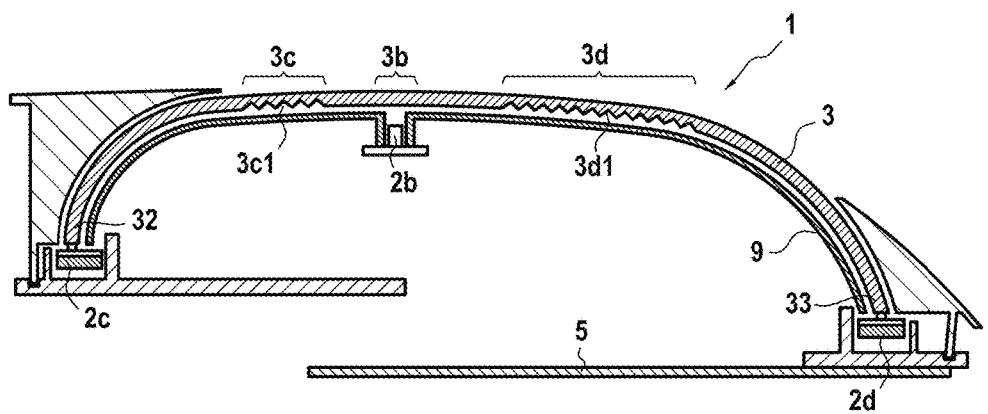

Reference is now made to FIGS. 4A and 4B which represent the device of FIG. 1 by cross-sectional views through planes, respectively P1 and P2.

All of the touch interface 3 is produced in a transparent or translucent material such that the touch interface 3 comprises light output portions 3a, 3b, 3c and 3d, each of the output portions 3a, 3b, 3c and 3d being associated with one of the light sources 2a, 2b, 2c and 2d, respectively, such that light rays emitted by one of these light sources 2a, 2b, 2c and 2d exit from the device 1 via its associated output portion 3a, 3b, 3c and 3d. The top mask 8 is arranged so as to surround the perimeter of all of the output portions 3a, 3b, 3c and 3d.

The first set of light sources 2a comprises two light sources 2a, each arranged between the mounting support 5 and the touch interface 3 at the level of an output portion 3a of reduced form in comparison to the extent of the touch interface 3.

Each light source 2a is a light-emitting diode suitable for emitting light of white color and is associated with a collimator 2a1 arranged to deflect the light rays emitted by this light source 2a towards a restricted predetermined area of the interior so as to produce a reader function. The controller of the device 1 is arranged such that, upon the detection of a contact on the touch interface 3 in the output portion 3a, this controller generates an instruction to switch on or switch off the associated light source 2a in such a way that this light source 2a emits light if it is off or stops emitting light if it is on.

The light source 2b is also arranged between the mounting support 5 and the touch interface 3 at the level of an output portion 3b of reduced form in comparison to the extent of the touch interface 3.

The light source 2b comprises a light-emitting diode suitable for emitting ultraviolet radiation. The output portion 3b comprises photoluminescent patterns produced in a fluorescent material suitable for emitting white light when it is subjected to ultraviolet radiation. It will thus be understood that the ultraviolet radiation emitted by the light source 2b will reach the photoluminescent patterns causing the emission of white light to produce a reader function. The controller of the device 1 is arranged such that, upon the detection of a contact on the touch interface 3 in the output portion 3b, this controller generates an instruction to switch on or switch off the light source 2b such that this light source 2b emits ultraviolet radiation if it is off or stops emitting this radiation if it is on.

The device 1 comprises a bottom mask 9 extending over the same dimensions as the touch interface 3 and arranged between the light sources 2a and 2b and the touch interface 3. The bottom mask 9 comprises orifices arranged facing the light source 2b and the collimators 2a1.

Each light source 2a and 2b and the collimators 2a1 are mounted on a printed circuit fixed to the bottom mask 9.

The light sources 2c are light-emitting diodes suitable for emitting light of white color and are arranged on the same printed circuit at an end 32 of the touch interface 3 such that light rays emitted by each of these light sources 2c penetrate into the touch interface 3. The touch interface 3 is thus arranged as a light guide to guide these light rays, via total internal reflection of these light rays on its internal walls, towards the output portion 3c.

The touch interface 3 comprises decoupling prisms 3c1 arranged in a strip on the output portion 3c and oriented such that light rays emitted by the light sources 2c propagating in the touch interface 3 and reaching these decoupling means 3c1 exit from the touch interface 3 through the output portion 3c.

The controller of the device 1 is arranged such that a contact on the touch interface 3 in the output portion 3c triggers the emission of light of a predetermined light power by the light sources 2c to produce a diffuse lighting in the interior. This predetermined light power is a function of the distance separating the point of contact from the light sources 2c. For example, a contact on the touch interface 3 on an area closest to the light sources 2c will trigger an instruction to switch off the light sources 2c while a contact on the touch interface 3 on an area away from the light sources 2c will trigger an instruction to switch on the light sources 2c for the emission of a maximum light power.

The light sources 2d are light-emitting diodes of RGB type suitable for selectively and/or jointly emitting blue, red or green colored light. These light sources 2d are arranged on one and the same printed circuit at an end 33 of the touch interface 3 such that light rays emitted by each of these light sources 2d penetrate into the touch interface 3 and are guided therein towards the output portion 3d.

The touch interface 3 comprises decoupling prisms 3d1 arranged in a strip in the output portion 3d and oriented such that light rays emitted by the light sources 2d propagating in the touch interface 3 and reaching these decoupling means 3d1 exit from the touch interface 3 through the output portion 3d.

The decoupling prisms 3c1 and 3d1 are exclusively associated with the respective light sources 2c and 2d, such that light rays emitted by one of these sources 2c or 2d, for example 2c, and reaching prisms associated with the other of these sources 2c or 2d, for example 3d1, retain the same path without being deflected by these prisms towards the outside of the output portion, for example 3d.

The above description clearly explains how the invention makes it possible to achieve the objectives set for it and notably to propose a device for lighting the interior of a vehicle for the interior lighting thereof using a touch interface 3 and which is compact and simple to manufacture while offering optimal performance levels.

However, the invention is not limited to just the device in accordance with the embodiment explicitly described in light of FIGS. 1 to 4D, nor is it limited only to one determined application. By way of example, it will be possible, without departing from the scope of the invention, to modify the number and the arrangement of the light sources 2a to 2d, and the number, the arrangement, even the structure of the sensor means 4.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a motor vehicle interior, the lighting device comprising:
    at least one light source configured to project light towards said motor vehicle interior;
    a touch interface for receiving a contact;
    sensor means for generating a signal for controlling said at least one light source in response to the contact of said touch interface; and
    a mounting support for attaching said touch interface to said motor vehicle interior,
    wherein said touch interface is coupled to said mounting support by said sensor means,
    wherein said lighting device further comprises at least three of said sensor means capable of preventing movement of said touch interface on said mounting support in a first direction, and
    wherein at least one of said sensor means is capable of preventing movement of said touch interface on said mounting support in second and third directions that are orthogonal to one another and to said first direction.

2. A motor vehicle comprising a device for lighting an interior of said motor vehicle according to claim 1.

3. The lighting device according to claim 1, wherein said lighting device further comprises at least one means for blocking movements of said touch interface on said mounting support in said second and third directions that are orthogonal to one another and to said first direction.

4. The lighting device according to claim 1, wherein said lighting device further comprises at least one means for blocking movements of said touch interface on said mounting support in said second and third directions that are orthogonal to one another and to said first direction.

5. The lighting device according to claim 4, wherein said blocking means comprises a flexible blade fixed both to said touch interface and to said mounting support.

6. The lighting device according to claim 1, wherein at least one output portion of said touch interface is produced in a transparent or translucent material such that light rays emitted by said at least one light source exits from said lighting device via said at least one output portion.

7. The lighting device according to claim 6, wherein said at least one light source is arranged between said mounting support and said touch interface at a level of said at least one output portion.

8. The lighting device according to claim 7, wherein said at least one light source is arranged at an end of said touch interface such that light rays emitted by said at least one light source penetrates into said touch interface, said touch interface being arranged as a light guide to guide the light rays to said at least one output portion.

9. The lighting device according to claim 6, wherein said at least one light source is arranged at an end of said touch interface such that light rays emitted by said at least one light source penetrates into said touch interface, said touch interface being arranged as a light guide to guide the light rays to said at least one output portion.

10. The lighting device according to claim 9, wherein said touch interface comprises decoupling means arranged at a level of said output portion and arranged such that light rays propagating in said touch interface and reaching said decoupling means exit from said touch interface through said at least one output portion.

11. The lighting device according to claim 1, wherein at least one or each of said sensor means comprises a groove into which is inserted a peripheral portion of said touch interface.

12. The lighting device according to claim 11, wherein said peripheral portion comprises a boss arranged to come into contact with and deform a wall of said groove into which said boss is inserted.

13. The lighting device according claim 12, wherein said at least one or each of said sensor means comprises a housing in which is arranged said groove, said at least one or each of said sensor means comprising a bottom sensor arranged between said groove and a bottom wall of said housing.

14. The lighting device according claim 11, wherein said at least one or each of said sensor means comprises a housing in which is arranged said groove, said at least one or each of said sensor means comprising a bottom sensor arranged between said groove and a bottom wall of said housing.

15. The lighting device according to claim 14, wherein said at least one or each of said sensor means further comprises a flexible element arranged between said groove and a top wall of said housing.

16. The lighting device according to claim 14, wherein said at least one or each of said sensor means further comprises a top sensor arranged between said groove and a top wall of said housing.

17. A lighting device for a motor vehicle interior, comprising:
    one or more light sources suitable for emitting light rays for the lighting of said motor vehicle interior;
    a touch interface and sensor means for detecting a contact on said touch interface and generating a signal characteristic of said contact according to which said one or more light sources are controlled; and
    a mounting support configured to attach the touch interface to the motor vehicle interior,
    wherein at least one output portion of said touch interface is produced in a transparent or translucent material such that light rays emitted by said one or more light sources exit from said lighting device via said at least one output portion, said touch interface being arranged as a light guide to guide the light rays to said at least one output portion, and
    wherein said sensor means is capable of preventing movement of said touch interface on said mounting support in first, second, and third directions that are orthogonal to one another.

18. A motor vehicle comprising a device for lighting an interior of said motor vehicle according to claim 17.

19. A lighting device for a motor vehicle interior, comprising:
    one or more light sources suitable for emitting light rays for lighting of said motor vehicle interior;
    a touch interface and a sensor for detecting a contact on said touch interface and generating a signal characteristic of said contact according to which said one or more light sources are controlled; and
    a mounting support for said touch interface in said motor vehicle interior,
    wherein said sensor is capable of preventing movement of said touch interface on said mounting support in first, second, and third directions that are orthogonal to one another.

* * * * *